United States Patent
Huang et al.

(10) Patent No.: US 6,783,157 B2
(45) Date of Patent: Aug. 31, 2004

(54) RACK HOUSING FOR STEERING GEAR (75) Inventors: Zugang Huang, Farmington Hills, MI (US); Stephen J. Green, Clarkston, MI (US)

(73) Assignee: TRW Inc., Lyndhurst, OH (US)

( * ) Notice: Subject to any disclaimer, the term of this patent is extended or adjusted under 35 U.S.C. 154(b) by 233 days.

(21) Appl. No.: 10/016,463

(22) Filed: Dec. 10, 2001

(65) Prior Publication Data

US 2003/0107200 A1 Jun. 12, 2003

(51) Int. Cl.[7] .............................................. B62D 21/12
(52) U.S. Cl. ............ 280/785; 280/93.515; 280/124.109; 280/124.153
(58) Field of Search .................... 280/93.514, 93.515, 280/124.153, 124.109, 785; 74/498

(56) References Cited

U.S. PATENT DOCUMENTS

| | | | | |
|---|---|---|---|---|
| 2,972,489 A | * | 2/1961 | Collier et al. | 280/124.102 |
| 3,074,735 A | * | 1/1963 | Ulrich | 280/93.514 |
| 3,207,254 A | | 9/1965 | D'Espinassy de Venel | |
| 3,745,850 A | * | 7/1973 | Bayle | 74/422 |
| 3,801,125 A | | 4/1974 | Gotzenberger et al. | |
| 3,864,989 A | | 2/1975 | Jones | |
| 4,060,011 A | * | 11/1977 | Jones | 74/498 |
| 4,066,278 A | * | 1/1978 | Takagi | 280/124.152 |
| 4,218,933 A | * | 8/1980 | Allen et al. | 74/422 |
| 4,428,450 A | * | 1/1984 | Stenstrom et al. | 180/428 |
| 4,630,701 A | | 12/1986 | Venetjoki | |
| 4,659,106 A | * | 4/1987 | Fujita et al. | 280/124.103 |
| 4,827,788 A | * | 5/1989 | Beer et al. | 74/422 |
| 5,613,572 A | * | 3/1997 | Moedinger | 180/400 |
| 5,879,026 A | * | 3/1999 | Dostert et al. | 280/781 |
| 5,975,573 A | * | 11/1999 | Belleau | 280/771 |
| 5,997,038 A | * | 12/1999 | Dostert et al. | 280/781 |
| 6,244,607 B1 | * | 6/2001 | Nishino | 280/124.107 |
| 6,408,976 B1 | * | 6/2002 | Saito et al. | 180/428 |
| 6,425,592 B1 | * | 7/2002 | Lee | 280/93.515 |

FOREIGN PATENT DOCUMENTS

EP 0794106 B1 9/2002

* cited by examiner

*Primary Examiner*—Eric Culbreth
*Assistant Examiner*—Deann Draper
(74) *Attorney, Agent, or Firm*—Tarolli, Sundheim, Covell & Tummino L.L.P.

(57) ABSTRACT

An apparatus for attachment to the body (240) of a vehicle (12) which has a front, rear and opposite sides and which has steerable wheels. The apparatus comprises a lower part (22) having structure (40, 48) for fixed attachment at each of the opposite sides of the vehicle. A first steering control arm (150) is pivotally connected to the lower part (22) at one side of the vehicle. A second steering control arm (160) is pivotally connected to the lower part (22) at an opposite side of the vehicle. An upper part (24) is connected with the lower part (22). A rack and pinion steering mechanism (10) includes a rack bar (180) movable axially in opposite directions to effect steering movement of the steerable wheels of the vehicle. The steering mechanism (10) includes a chamber (80) through which the rack bar (180) extends. The chamber is defined by surfaces of the upper and lower parts (22, 24).

32 Claims, 4 Drawing Sheets

RACK HOUSING FOR STEERING GEAR

BACKGROUND OF THE INVENTION

1. Technical Field

The present invention relates to a rack housing for a steering gear. In particular, the present invention relates to a vehicle cross member that includes a rack housing for a rack and pinion steering gear.

2. Description of the Prior Art

There are four general types of rack and pinion steering systems to which the present invention relates. Each includes a rack housing through which the steering rack extends.

First is manual rack and pinion steering. In this type of steering system, the manual drive pinion assembly is attached to one end of the rack housing, and a bearing is mounted at the other end of the rack housing. The rack bar extends through the open space between. The rack bar is supported at the one end of the rack housing by the pinion assembly. The rack bar is supported at the other end of the rack housing by the bearing.

Second is belt drive electric steer. In this type of steering system, the non-driving pinion assembly is attached to one end of the rack housing, and the electric motor belt drive with ball nut assembly is mounted at the other end of the rack housing. The rack bar extends through the open space between. The rack bar is supported at one end of the rack housing by the pinion assembly. The rack bar is supported at the other end of the rack housing by the ball nut of the belt drive assembly.

Third is pinion drive electric steer. In this type of steering system, the non-driving pinion assembly is attached to one end of the rack housing, and the electric motor second pinion drive assembly is mounted at the other end of the rack housing. The rack bar extends through the open space between. The rack bar is supported at one end of the rack housing by the non-driving pinion assembly. The rack bar is supported at the other end of the rack housing by the pinion drive assembly.

Fourth is column drive electric steer. In this type of steering system, the electric motor is mounted on the steering column and drives a shaft to rotate, which drives the pinion. The pinion assembly is attached to one end of the rack housing, and a bearing is mounted at the other end of the rack housing. The rack bar extends through the open space between. The rack bar is supported at the one end of the rack housing by the pinion assembly. The rack bar is supported at the other end of the rack housing by the bearing, similar to a manual steer system.

In all these cases, the rack housing serves the following functions:

(a) Support the parts of the steering assembly, including the pinion and the drive (if any), on the vehicle.

(b) Support the rack bar for axial sliding movement on the vehicle.

(c) Contain lubricant on the rack bar. The rack gear teeth on the rack bar are lubricated. The rack bar, including the teeth, moves about 8 inches lock to lock relative to the pinion. Thus, there is a significant portion of the rack bar that is away from the pinion assembly at any time, and that portion is lubricated. The lubricant on that portion must be contained, that is, kept on the rack bar. The rack bar is enclosed in a rack housing to do this. The rack housing is typically a tubular structure that closely encloses the cylindrical rack bar. The larger cross-section of the rack housing, the stronger the piece is, which is beneficial to providing strength for the vehicle front end. On the other hand, the design of the rack housing must also be tailored to contain lubricant, which usually entails keeping the rack housing as small in cross-section as possible compared to the diameter of the rack bar.

Typically the steering assembly is a self contained unit that includes a non-structural rack housing to perform all these functions. The steering assembly including the rack housing is mounted to a structural portion of the vehicle body to support the steering assembly on the vehicle.

U.S. Pat. No. 3,864,989 shows a front suspension assembly for a motor vehicle in which a rack and pinion housing extends across the front end of the vehicle and carries the front wheel guidance arms. The rack housing is a tubular cylindrical structure slightly larger in diameter than the rack bar that passes through it.

SUMMARY OF THE INVENTION

The present invention is an apparatus for attachment to the body of a vehicle which has a front, rear and opposite sides and which has steerable wheels. The apparatus comprises a lower part having structure for fixed attachment at each of the opposite sides of the vehicle. A first steering control arm is pivotally connected to the lower part at one side of the vehicle. A second steering control arm is pivotally connected to the lower part at an opposite side of the vehicle. An upper part is connected with the lower part. A rack and pinion steering mechanism includes a rack bar movable axially in opposite directions to effect steering movement of the steerable wheels of the vehicle. The steering mechanism includes a chamber through which the rack bar extends. The chamber is defined by surfaces of the upper and lower parts.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF THE INVENTION

Figure 1:
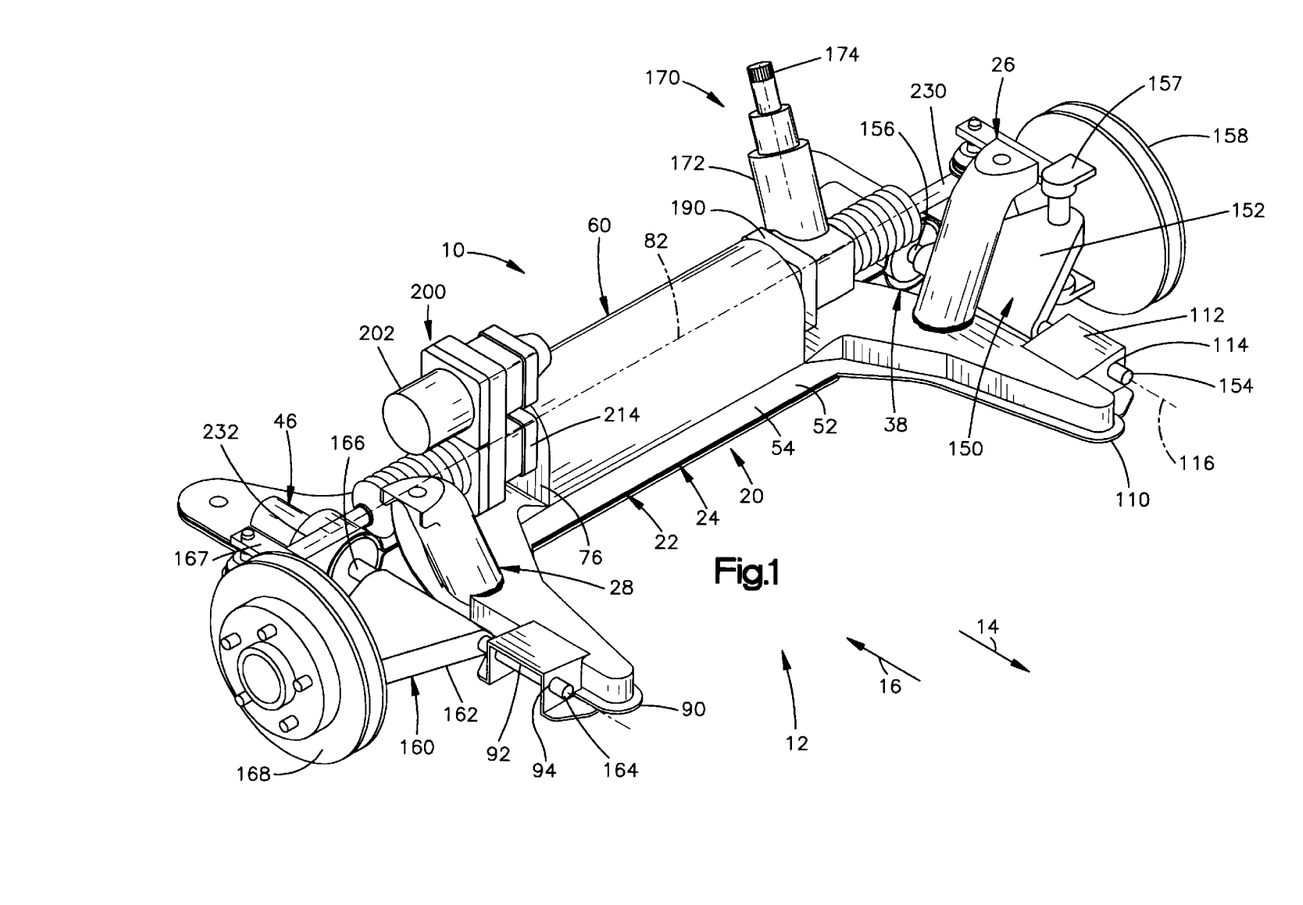
FIG. 1 is a perspective view of a vehicle front end including a cross member and steering system in accordance with the present invention.

The present invention relates to a rack housing for a steering gear. In particular, the present invention relates to a vehicle in which a portion of a vehicle cross member serves as a rack housing. As representative of the present invention, FIG. 1 illustrates a steering system 10. The steering system 10 forms part of a vehicle shown partially at 12. A forward direction in the vehicle is indicated by the arrow 14, and a rearward direction in the vehicle is indicated by the arrow 16. The vehicle 12 includes left and right steerable road wheels (not shown).

The vehicle 12 includes a cross member 20. The cross member 20 extends across the vehicle 12 between the left and right sides of the vehicle. The cross member 20 supports the steering assembly 10, and also supports the left and right road wheels of the vehicle 12.

In the illustrated embodiment, the cross member 20 is fabricated from a plurality of different pieces of material. Specifically, the cross member 20 is welded from four or more pieces of material, such as steel stampings. The four pieces include a lower part 22, an upper part 24, a left upright 26, and a right upright 28. The cross member 20 may be made in another manner or from different material.

The lower part 22, in the illustrated embodiment, is a sheet metal stamping. The lower part 22 includes a central portion 30 that is illustrated as being flat, or planar, but that could have a non-planar configuration. The central portion 30 of the lower part 22 extends for the major portion of the length of the lower part.

Figure 2:
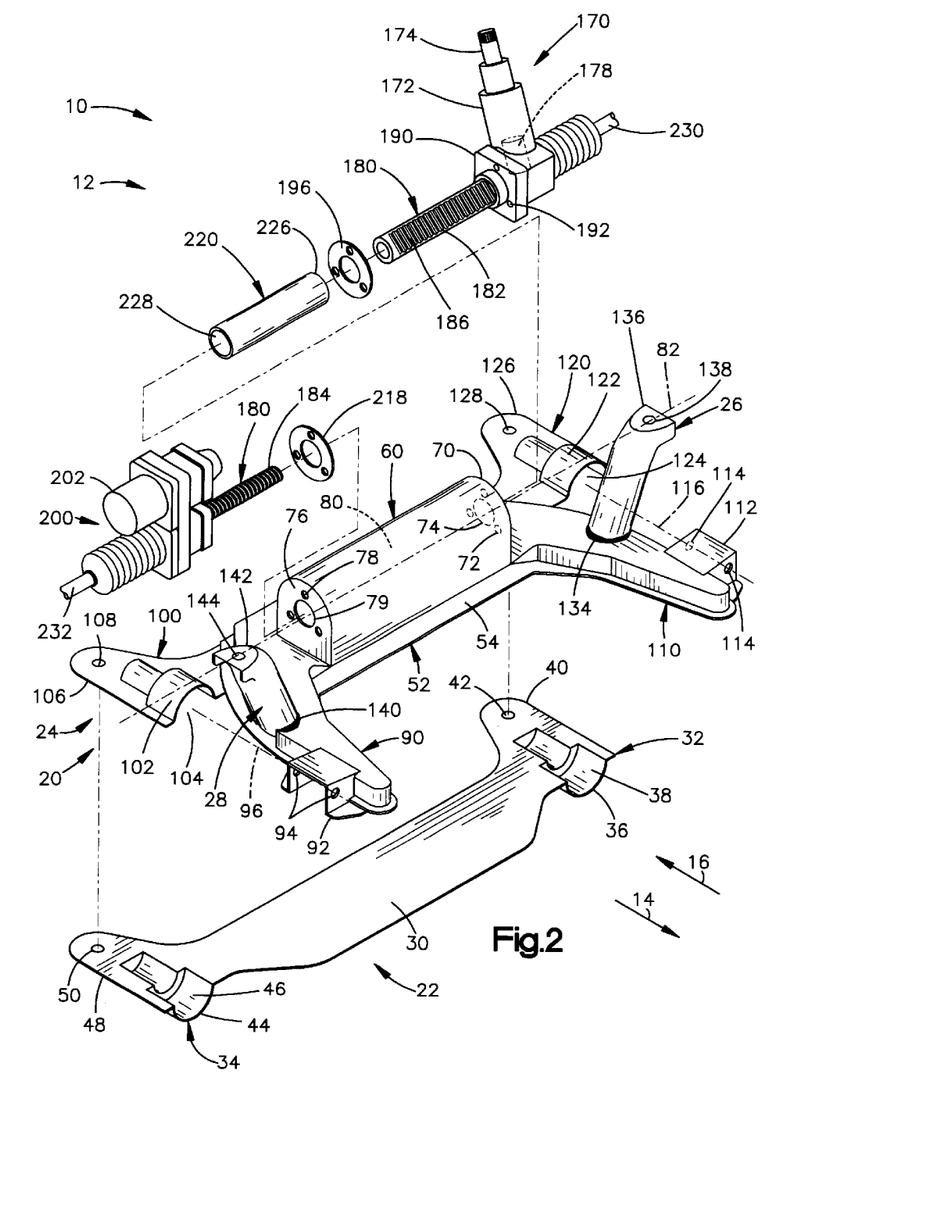
FIG. 2 is an exploded view of parts of the cross member and steering system of FIG. 1.
Figure 3:
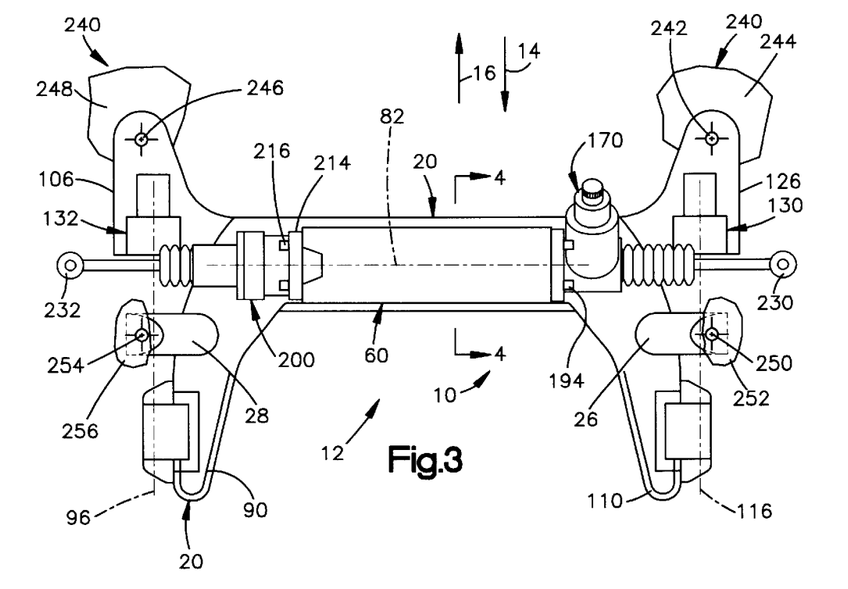
FIG. 3 is a top plan view of the cross member and steering system of FIG. 1.

The lower part 22 also includes left and right end portions 32 and 34 at opposite ends of the central portion 30. The left end portion 32 includes a downwardly projecting control arm support portion 36 that partially defines a left control arm rear support chamber 38 (FIGS. 2 and 3). The left end portion 32 also includes a mounting portion 40. The mounting portion 40 includes a fastener opening 42.

The right end portion 34 of the lower cross member part 22, which is a mirror image of the left end portion 32, includes a downwardly projecting control arm support portion 44 that partially defines a right control arm rear support chamber 46 (FIGS. 2 and 3). The right end portion 34 also includes a mounting portion 48. The mounting portion 48 includes a fastener opening 50.

The upper part 24 of the cross member 20, in the illustrated embodiment, is a sheet metal stamping that includes a central portion 52. The central portion 52 includes a base portion 54 that is illustrated as being flat, or planar, but that could have a non-planar configuration. The central portion 52 of the upper part 24 extends for the major portion of the length of the upper part.

The central portion 52 of the upper part 24 of the cross member also includes a rack housing 60. The rack housing 60 in the illustrated embodiment is formed as one piece with the other portions of the upper part 24 of the cross member 20, but could alternatively be formed as a separate part of the cross member.

Figure 4:
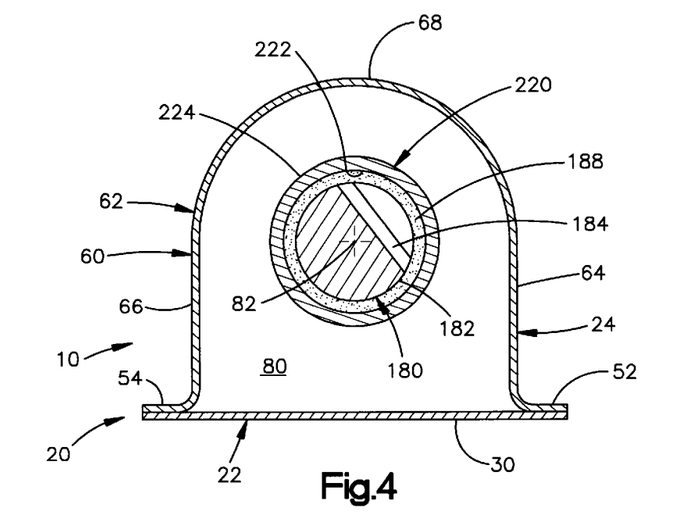
FIG. 4 is a sectional view through a rack housing portion of the cross member and steering system of FIG. 1, taken along line 4—4 of FIG. 3.

The rack housing 60 has a main wall 62 (FIG. 4) with an upside-down U-shaped cross-sectional configuration, including a front wall portion 64, a back wall portion 66, and a top wall portion 68. The rack housing 60 also has a left end wall 70 (FIG. 2) with three fastener openings 72 disposed in an array around a larger central opening 74. The rack housing 60 also has a right end wall 76 with three fastener openings 78 disposed in an array around a larger central opening 79. The walls 62, 70 and 76 all project from the base portion 54 of the central portion 52 of the upper part 50 of the cross member 20.

The main wall 62 and the end walls 70 and 76 of the rack housing 60 partially define a rack chamber 80 in the cross member 20. The base portion 54 of the central portion 52 of the upper part 20 has an opening at the location of the rack chamber 80, so that the rack chamber is open to the central portion 30 of the lower part 22 of the cross member 20. Thus, the lower part 22 of the cross member 20 closes, and forms the bottom wall of, the rack chamber 80.

The rack housing 60 is thus a generally cylindrical part of the cross member 20, which is centered on and defines a steering axis 82. The rack housing 60 projects radially (relative to the axis 82) from one side of the cross member 20. The rack housing 60 is shorter (left-to-right, or side to side) than the cross member 20 as a whole. Preferably, the length of the rack housing 60 is only 30% to 60% of the length of the cross member 20.

The upper part 24 of the cross member 20 has an X-shaped or H-shaped configuration including a right front arm portion 90 (FIGS. 1 and 2). The right front arm portion 90 extends laterally outward and forward from the central portion 52 of the upper part 24, in and above the plane of the base portion 54. The arm portion 90 includes a right control arm front support portion 92 that has openings 94 centered on a right pivot axis 96. The support portion 92 is located forward of the steering axis 82. In the illustrated embodiment, the support portion 92 is formed as one piece with the remainder of the upper part 24, but it could alternatively be a separate piece such as a sheet metal stamping welded to the remainder of the upper part 24.

The upper part 24 of the cross member 20 includes a right rear arm portion 100. The right rear arm portion 100 extends laterally outward and rearward from the base portion 54 of the upper part 24, in the plane of the base portion. A right control arm rear support portion 102 projects upward and partially defines the support chamber 46 at a location centered on the right pivot axis 96. An outer end portion 106 of the right rear arm portion 100 of the upper part 24 of the cross member 20 is formed as a mounting portion and has a fastener opening 108.

The upper part 24 of the cross member 20 includes a left front arm portion 110. The left front arm portion 110 extends laterally outward and forward from the central portion 52 of the upper part 24, in and above the plane of the base portion 54. The arm portion 110 includes a left control arm front support portion 112 that has openings 114 centered on a left pivot axis 116. The support portion 112 is located forward of the steering axis 82. In the illustrated embodiment, the support portion 112 is formed as one piece with the remainder of the upper part 24, but could alternatively be, for example, a separate sheet metal stamping welded to the remainder of the upper part 24.

The upper part 24 of the cross member 20 further includes a left rear arm portion 120. The left rear arm portion 120 is a mirror image of the right rear arm portion 100. The left rear arm portion 120 extends laterally outward and rearward from the base portion 54 of the upper part 24, in the plane of the base portion. A left control arm rear support portion 112 projects upward and partially defines the support chamber 38 at a location centered on the left pivot axis 116. An outer end portion 126 of the right rear arm 120 of the upper part 24 of the cross member 20 is formed as a mounting portion and has a fastener opening 28.

When the upper part 24 of the cross member 20 is welded to the lower part 22, as shown by the darkened edges in FIG. 1, the left rear arm 120 of the upper part 24 overlies the left end portion 32 of the lower part 22. The two control arm support portions 122 and 36 align with each other to form the left control arm chamber 38 (FIGS. 1 and 3). The left control arm chamber 38 aligns with the openings 114 in the support portion 112, on the left control arm pivot axis 116. The mounting portion 126 of the upper part 24 overlies the mounting portion 40 of the lower part 22. The fastener opening 128 in the upper part 24 aligns with the fastener opening 42 in the lower part 22.

In a similar manner, the right rear arm 100 of the upper part 24 overlies the right end portion 34 of the lower part 22. The two control arm support portions 102 and 44 align with each other and together form the right control arm support chamber 46 (FIGS. 1 and 3). The right control arm chamber support 46 aligns with the openings 94 in the support portion 92, on the right control arm pivot axis 96. The mounting portion 106 of the upper part 24 overlies the mounting portion 48 of the lower part 22. The fastener opening 108 in the upper part 24 aligns with the fastener opening 42 in the lower part 22.

The left upright 26 extends from the left front arm portion 110 of the upper part 24 of the cross member 20. A lower end portion 134 of the left upright 26 is welded to the left front arm at a location forward of the steering axis 82. An upper end portion 136 of the left upright 26 is formed as a fastening pad including a bolt hole 138.

The right upright 28 is a mirror image of the left upright 26 and extends from the right front arm 90 of the upper part 24 of the cross member 20. A lower end portion 140 of the right upright 28 is welded to the right front arm 90 at a location forward of the steering axis 82. An upper end portion 142 of the right upright 28 is formed as a fastening pad including a bolt hole 144.

The vehicle includes a left control arm shown schematically at 150 (FIG. 1). The left control arm 150 is supported on the cross member 20 for pivotal movement relative to the cross member. Specifically, the left control arm 150 includes a main body portion 152, a forward pivot pin 154, and a rear pivot pin 156. The forward pivot pin 154 is received in the openings 114 in the cross member 20. The rear pivot pin 156 is received in the left control arm rear support 38. As a result, the left control arm 150 is supported on the cross member 20 for pivotal movement relative to the cross member 20 about the left control arm pivot axis 116.

The vehicle includes a left steering knuckle shown schematically at 157. The left steering knuckle 157 as illustrated is supported on the left lower control arm 150 for pivotal movement relative to the control arm about a generally vertical axis. The steering knuckle 157 is fixed for movement with a rotor 158. The rotor 158 supports the left steerable road wheel (not shown).

The vehicle 12 includes a right control arm shown schematically at 160. The right control arm 160 is supported on the cross member 20 for pivotal movement relative to the cross member. Specifically, the right control arm 120 includes a main body portion 162, a forward pivot pin 164, and a rear pivot pin 166. The forward pivot pin 164 is supported in the openings 94 in the right control arm front support portion 92. The rear pivot pin 166 is supported in the right control arm rear support 46. As a result, the right control arm 160 is supported on the cross member 20 for pivotal movement relative to the cross member 20 about the right control arm pivot axis 96.

The vehicle 12 includes a right steering knuckle 167 (FIG. 1) supported on the right lower control arm 160 for pivotal movement relative to the control arm about a generally vertical axis. The steering knuckle 167 is fixed for movement with a rotor 168. The rotor 168 supports the right steerable road wheel (not shown).

The steering system 10 is operative to control movement of the steering knuckles 157 and 167 relative to the cross member 20, and thereby control steering movement of the steerable vehicle wheels, in response to driver input. The steering system 10 includes a steering input assembly 170. The steering input assembly 170 includes a pinion housing assembly 172, which is preferably made from metal. The pinion housing assembly 172 supports the steering input shaft 174, which is connected for rotation with the vehicle steering wheel (not shown). The steering input shaft 174 is connected by a torsion bar (not shown) for rotation with a pinion shown schematically at 178. The pinion 178 has external gear teeth (not shown).

The steering system 10 includes an actuator or rack bar 180. The rack bar 180 is an elongate member centered on and movable along the steering axis 82. The rack bar 180 has a rack tooth portion 182 and a screw thread portion 184. The rack tooth portion 182 may be formed separately from and joined to the screw thread portion 184, as shown in FIG. 2, and connected for movement therewith in a known manner (not shown). Alternatively, the rack tooth portion 102 of the rack bar 180 may be formed as one piece with the screw thread portion 184 of the rack bar.

The rack tooth portion 182 of the rack bar 180 is supported in the pinion housing assembly 172 for axial movement relative to the pinion housing assembly. The rack tooth portion 182 of the rack bar 180 has a series of rack teeth 186 that are in meshing engagement with the gear teeth on the pinion 178. As a result, rotation of the pinion 178 results in axial movement of the rack bar 180 along the steering axis 82, and vice versa.

The rack tooth portion 182 of the rack bar 180 has an axial extent of, for example, six to ten inches, depending on the amount of axial travel of the rack bar that is used to effect turning movement of the steerable vehicle wheels. At any one time, only a portion of this six to eight inch length is located within the pinion housing assembly 172. The remainder of the rack tooth portion 182 projects laterally inward from the pinion housing assembly 172, as shown in FIG. 2.

The rack tooth portion 182 of the rack bar 180 is lubricated, for example with a grease or other lubricant 188 (FIG. 4), needed because of the engagement of the rack teeth 186 with the pinion gear 178. This lubricant 188 may also extend onto the screw thread portion 184 of the rack bar 180.

The steering input assembly 170 is mounted on the rack housing 60. Specifically, the pinion housing assembly 172 includes a mounting flange 190. Three fastener openings 192 are formed in the mounting flange 190. The fastener openings 192 in the mounting flange 190 align with the fastener openings 72 in the left end wall 70 of the rack housing 60. Three fasteners 194 (FIG. 3), such as bolts, extend through the fastener openings 192 and 72. A seal 196 seals between the mounting flange 190 and the end wall 70.

The fasteners 194 secure the steering input assembly 170 to the rack housing 60 of the cross member 20. In this condition, the rack tooth portion 182 of the rack bar 180 extends through the central opening 74 in the left end wall 70 of the rack housing 60, and into the rack chamber 80 in the rack housing 60.

Figure 5:
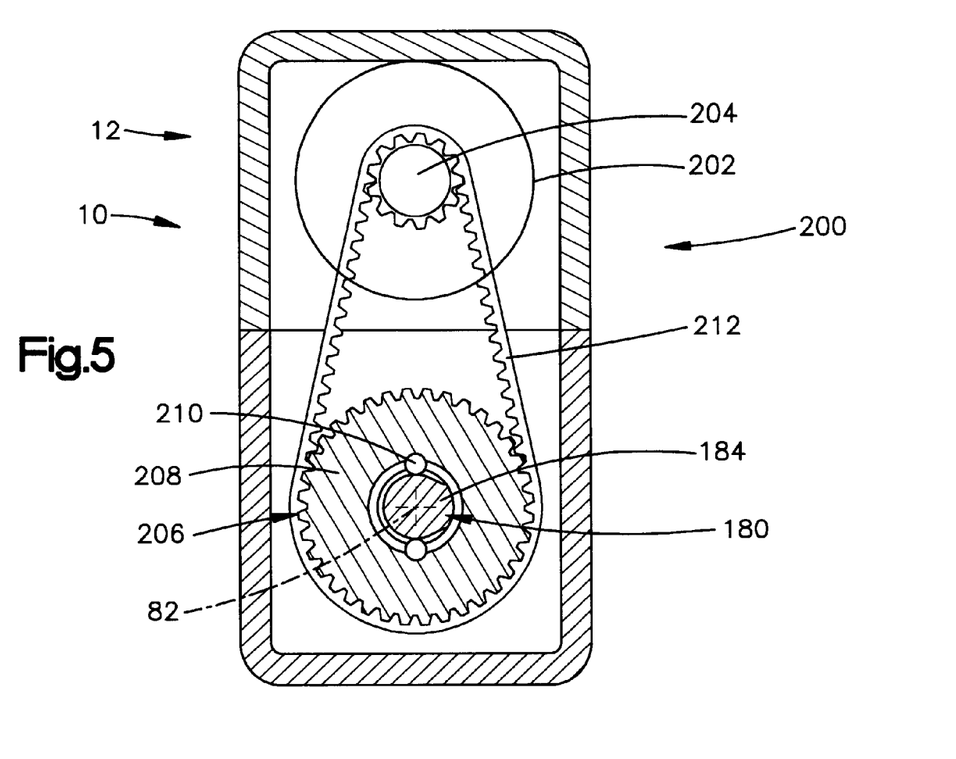
FIG. 5 is a schematic sectional view of a belt drive assembly that forms part of the steering system of FIG. 1.

The steering system 10 includes a belt drive assembly 200 (FIGS. 2 and 5). The belt drive assembly 200 includes an electric motor 202 that has an externally toothed output shaft or gear 204. The belt drive assembly 200 also includes a ball nut assembly 206. The ball nut assembly 206 includes a ball nut 208 and a plurality of balls 210. The balls 210 are disposed between and couple the ball nut 208 to the screw thread portion 184 of the rack bar 180, at a location outside the rack chamber 80, in a known manner. The screw thread portion 184 of the rack bar 180 is thus supported by the belt drive assembly 200 for axial movement relative to the belt drive housing assembly and the cross member 20.

A drive belt 212 is trained on the output shaft 204 of the motor 202 and on the ball nut 208. Actuation of the electric motor 202 is controlled by electric current over lead wires (not shown) or in another manner. When the motor 202 is actuated, the output shaft 204 rotates, and the drive belt 212 causes the ball nut 208 to rotate. Rotation of the ball nut 208 results in axial movement of the screw thread portion 184 of the rack bar 180 and thus also of the rack tooth portion 182 of the rack bar 180.

The belt drive assembly 200 is mounted to the rack housing 60. Specifically, the belt drive assembly 200 includes a mounting flange 214. Three fastener openings (not shown) are formed in the mounting flange 214. The fastener openings in the mounting flange 214 align with the fastener openings 78 in the right end wall 76 of the rack housing 60. Three fasteners 216 (FIG. 3), such as bolts, extend through the fastener openings 78 and through the fastener openings in the mounting flange 214. A seal 218 seals between the mounting flange 214 and the end wall 76.

The fasteners 216 secure the belt drive assembly 200 to the rack housing 60. In this condition, the screw thread portion 182 of the rack bar 180 extends through the central opening 79 in the right end wall 76 of the rack housing 60, and into the rack chamber 80 in the rack housing 60. As a result, the rack housing 60 of the cross member 20 supports the rack bar 180 for axial sliding movement on the vehicle 12, via the belt drive assembly 200 and the steering input assembly 170, relative to the cross member 20.

The steering system 10 includes a lubricant retainer tube or sleeve 220. The sleeve 220 is a tubular member, fitted closely over the rack tooth portion 182 of the rack bar 180. The sleeve 220 in the illustrated embodiment is made from a thin plastic material, but could alternatively be made from a different material.

The sleeve 220 in the illustrated embodiment has a tubular, cylindrical configuration including parallel, cylindrical inner and outer side surfaces 222 and 224. The sleeve 220 also has opposite first and second end portions 226 and 228.

The sleeve 220 helps to contain lubricant 188 on the rack bar 180. The section of the rack bar 180 that is disposed in the chamber 80 in the rack housing 60 is lubricated. The sleeve 220 is closely fitted about the rack bar 180. The sleeve 220 thus prevents lubricant 188 from moving radially outward, off the rack bar 180, even though the rack bar here is in a relatively large open space (the chamber 80).

Because the steering system 10 includes the sleeve 220, the rack housing 60, itself, need not perform the necessary function of maintaining the lubricant 188 on the rack bar 180. As a result, the rack housing 60 can have a relatively large cross-sectional area as compared to the rack bar 180, for example, as seen in the embodiment illustrated in FIG. 4. In the illustrated embodiment, the cross-sectional area of the rack housing 60 is about seven times the cross-sectional area of the rack bar 180. It is anticipated that this ratio could be in the range of from just over one to one, to ten to one or more.

Because of the relatively large cross-sectional area of the rack housing 60, the rack housing has significantly increased strength, as compared to a typical rack housing that is a narrow diameter tubular structural member closely fitted about the rack bar. More strength is provided for the vehicle front end of the vehicle 12 because the cross member 20 is larger and thus stronger.

The vehicle 12 includes steering linkage for transmitting axial movement of the rack bar 180 to the steerable road wheels (not shown) of the vehicle. The steering linkage includes a left side tie rod assembly 230 that extends away from the pinion housing 172. The left tie rod assembly 230 is connected between the rack bar 180 and the left steering knuckle 157. A right side tie rod assembly 232 extends away from the belt drive assembly 200. The right side tie rod assembly 232 is connected between the rack bar 180 and the right side steering knuckle 167.

Upon operation of the electric motor 202, motive force is transmitted through the ball nut 208 to the rack bar 180. The rack bar 180 moves axially. The axial movement of the rack bar 180 is transmitted, through the tie rod assemblies 230 and 232, to the left and right steerable wheels of the vehicle, to effect steering of the vehicle 12.

The cross member 20, including the rack housing 60, is rigidly mounted as one piece to the vehicle body and/or frame 240 (FIG. 3). Specifically, a fastener 242 extends through the aligned fastener openings 128 and 42 in the left rear arm 126 of the upper part 24 and the left end portion 40 of the lower part 22, respectively, to secure the left end of the cross member 20 to the vehicle body and/or frame 240 at a first location 244. This first location 244 is disposed rearward of the steering axis 82 and the steering linkage 230.

A second fastener 246 extends through the aligned fastener openings 108 and 50 in the right rear arm 100 of the upper part 24 and the right end portion 48 of the lower part 20, respectively, to secure the right end of the cross member 20 to the vehicle body and/or frame 240 at a second location 248. This second location 248 is disposed rearward of the steering axis 82 and the steering linkage 232.

A third fastener 250 extends through the fastener opening 138 in the left upright 26, to secure the left upright to the vehicle body and/or frame 240 at a third location 252. This third location 252 is disposed forward of the steering axis 82 and the steering linkage 230.

A fourth fastener 254 extends through the fastener opening 144 in the right upright 28, to secure the right upright to the vehicle body and/or frame 240 at a fourth location 256. This fourth location 256 is disposed forward of the steering axis 82 and the steering linkage 232. The cross member 20 is securely fixed in position in the vehicle 12 by the four fasteners 242, 246, 250 and 254.

It can be seen that the cross member 20 provides the support points for both the front and rear pivots of each of the left and right control arms 150 and 160. The cross member 20 also forms the rack housing 60 for the steering system 10. The cross member 20 is a rigid, self-supporting structure that forms a subframe or cradle of the vehicle 12. As a result, during assembly of the vehicle 12, one can attach to the cross member 20 most of the vehicle suspension and steering, and then mount that assembly as a unit to the vehicle body and/or frame 240.

Specifically, in assembly of the vehicle 12, the steering system 10 is preferably mounted to the cross member 20 before the cross member is mounted to the vehicle body and for frame 240. Also, the control arms 150 and 152, the steering knuckles 157 and 167, and the rotors 158 and 168 are preferably mounted to the cross member 20 before the cross member is mounted to the vehicle body and for frame 240. Therefore, the entire assembly of the cross member 20, steering system 10, control arms 150 and 152, and rotors 158 and 168, can be mounted to the vehicle 12 as one piece during assembly of the vehicle.

In the present invention, the rack housing 60 is thus part of a cross member 20 that has attachment points 244, 248, 252 and 256 well forward and rearward of each other. This provides a structurally stronger cross member that is inherently quite supportive. The attachment locations 244, 248, 252 and 256 are in the range of from about 6 inches to about 24 inches or more apart in a front to back direction.

In the present invention, the rack housing 60 itself is relatively short and the rack bar 180 is exposed for a major portion of its length between the tie rods 230 and 232. This means that there is only a relatively short length of rack bar 180 for which it is necessary to seal in the lubricant 188. Also, because the rack housing 60 has a length that is a relatively small percentage of the length of the cross member as a while, the input assembly 170 and the belt drive assembly 200 can be mounted close to each other. This means that only a relatively short length of the rack bar 180, between the assemblies 170 and 200, need be maintained straight. The rack housing, further, has two exposed end walls. This feature enables easy mounting of an electric steer system.

The present invention is applicable to different types and configurations of steering systems. For example, the present invention, in the illustrated embodiment, is shown as belt drive electric steer. In this type of steering system, the non-driving pinion assembly is attached to one end of the rack housing, and the electric motor belt drive with ball nut assembly is mounted at the other end of the rack housing. The rack bar extends through the open space between. The rack bar is supported at one end of the rack housing by the pinion assembly. The rack bar is supported at the other end of the rack housing by the ball nut of the belt drive assembly. The rack housing end walls provide support for both the pinion assembly and the belt drive assembly.

For a pinion drive electric steering system, the non-driving pinion assembly would be attached to one end wall of the rack housing, and the electric motor second pinion drive assembly would be mounted at the other end wall of the rack housing. For a column drive electric steering system, the pinion assembly would be attached to one end wall of the rack housing, and a bearing mounted at the other end wall of the rack housing. For a manual rack and pinion steering system, the manual drive pinion assembly would be attached to one end wall of the rack housing, and a bearing would be mounted at the other end wall of the rack housing.

In all these cases, the rack housing 60 as part of the cross member 20 would serve the following functions, as it does in the illustrate embodiment: support the parts of the steering assembly, including the pinion and the drive (if any), on the vehicle; and, support the rack bar for axial sliding movement on the vehicle.

The rack housing would not itself need to contain the lubricant that is on the rack bar, because of the presence of the sleeve 220. Therefore, the rack housing can be made with a large cross-section. The larger the cross-section, the stronger the cross member, and the more strength is provided for the vehicle front end—especially as compared to the type of front suspension assembly shown in U.S. Pat. No. 3,864,989.

From the above description of the invention, those skilled in the art will perceive improvements, changes and modifications in the invention. Such improvements, changes and modifications within the skill of the art are intended to be covered by the appended claims.

Having described the invention, we claim:

1. Apparatus for attachment to the body of a vehicle which has a front, rear and opposite sides and which has steering linkage connected to steerable wheels, said apparatus comprising:

a lower part having structure for fixed attachment at each of the opposite sides of the vehicle;

a first control arm pivotally connected to said lower part at one side of the vehicle;

a second control arm pivotally connected to said lower part at an opposite side of the vehicle;

an upper part connected with said lower part; and a rack and pinion steering mechanism including a rack bar movable axially in opposite directions to effect steering movement of the steerable wheels of the vehicle;

said steering mechanism including a chamber through which said rack bar extends;

said chamber being defined by surfaces of said upper and lower parts.

2. Apparatus as set forth in claim 1 wherein each one of said upper and lower parts is a sheet metal stamping.

3. Apparatus as set forth in claim 2 wherein said upper and lower parts are welded together.

4. Apparatus as set forth in claim 1 wherein said chamber has a larger cross-sectional area than said rack bar.

5. Apparatus as set forth in claim 4 wherein the cross-sectional area of said chamber is in the range of from two to ten times the cross-sectional area of said rack bar.

6. Apparatus as set forth in claim 1 further comprising a sleeve in said chamber for maintaining lubricant on said rack bar.

7. Apparatus as set forth in claim 6 wherein said sleeve is made from plastic.

8. Apparatus as set forth in claim 1 wherein each one of said upper and lower parts is a sheet metal stamping, said upper and lower parts are welded together, the cross-sectional area of said chamber is in the range of from two to ten times the cross-sectional area of said rack bar, and further comprising a sleeve in said chamber for maintaining lubricant on said rack bar.

9. Apparatus as set forth in claim 1 wherein said lower part and said upper part form a cross-member, said cross-member has attachment structure for fixed attachment at the opposite sides of the vehicle at locations forward of and rearward of the steering linkage, said first control arm is pivotally connected to said cross member at locations forward of and rearward of the steering linkage, and said second control arm is pivotally connected to said cross member at locations forward of ar rearward of the steering linkage.

10. Apparatus for attachment to the body of a vehicle which has a front, a rear, and Opposite sides and which has steerable wheels, said apparatus comprising:

a rack and pinion steering mechanism including a rack bar movable axially in opposite directions to effect steering movement of the steerable wheels of the vehicle, and steering linkage extending from opposite ends of said rack bar for connection with the steerable wheels of the vehicle;

a cross-member having attachment structure for fixed attachment at the opposite sides of the vehicle at locations forward of and rearward of the steering linkage;

a first control arm pivotally connected to said cross member at one side of the vehicle at locations forward of and rearward of the steering linkage;

a second control arm pivotally connected to said cross member at an opposite side of the vehicle at locations forward of and rearward of the steering linkage;

said cross-member having a rack housing portion defining a chamber through which a lubricated portion of said rack bar extends; and a sleeve in said chamber, said lubricated portion of said rack bar extending through said sleeve to maintain lubricant on said lubricated portion of said rack bar.

11. Apparatus as set forth in claim 10 wherein said sleeve is a cylindrical length of plastic tubing.

12. Apparatus for attachment to the body of a vehicle which has a front, a rear, and opposite sides and which has steerable wheels, said apparatus comprising:

a rack and pinion steering mechanism including a rack bar movable axially in opposite directions to effect steering movement of the steerable wheels of the vehicle, and steering linkage extending from opposite ends of said rack bar for connection with the steerable wheels of the vehicle;

a cross-member having attachment structure for fixed attachment at the opposite sides of the vehicle at locations forward of and rearward of the steering linkage;

a first control arm pivotally connected to said cross member at one side of the vehicle at locations forward of and rearward of the steering linkage;

a second control arm pivotally connected to said cross member at an opposite side of the vehicle at locations forward of and rearward of the steering linkage;

said cross-member having a rack housing portion defining a chamber through which a lubricated portion of said rack bar extends; and said cross-member is a rigid, self-supporting structure that forms a subframe or cradle of the vehicle, said locations forward of and rearward of the steering linkage being spaced apart by a distance having a front-to back component of at least 12 inches.

13. Apparatus as set forth in claim 12 wherein said cross-member has an X-shaped or H-shaped configuration including a central portion that extends across the vehicle with first and second ends, first and second arm portions that extend forward and rearward from said first end of said central portion, and third and fourth arm portions that extend forward and rearward from said second end of said central portion, said attachment structure comprising said first and second and third and fourth arm portions.

14. Apparatus for attachment to the body of a vehicle which has a front, a rear, and opposite sides and which has steerable wheels, said apparatus comprising:

a rack and pinion steering mechanism including a rack bar movable axially in opposite directions to effect steering movement of the steerable wheels of the vehicle, and steering linkage extending from opposite ends of said rack bar for connection with the steerable wheels of the vehicle;

a cross-member having attachment structure for fixed attachment at the opposite sides of the vehicle at locations forward of and rearward of the steering linkage;

a first control arm pivotally connected to said cross member at one side of the vehicle at locations forward of and rearward of the steering linkage;

a second control arm pivotally connected to said cross member at an opposite side of the vehicle at locations forward of and rearward of the steering linkage;

said steering mechanism includes a steering column for supporting a steering wheel and a pinion rotatable with said steering wheel and disposed in a pinion housing, a rack housing portion of said cross-member having first and second opposite end portions spaced laterally inward from said structure for fixed attachment at the opposite sides of the vehicle at locations forward of and rearward of the steering linkage; and said pinion housing being supported on said first end portion of said rack housing portion at a location laterally outward of said rack housing portion.

15. Apparatus as set forth in claim 14 wherein said steering system further comprises an electric motor drive supported on said second end portion of said rack housing portion at a location laterally outward of said rack housing portion.

16. Apparatus for attachment to the body of a vehicle which has a front, a rear, and opposite sides and which has steerable wheels, said apparatus comprising:

a rack and pinion steering mechanism including a rack bar movable axially in opposite directions to effect steering movement of the steerable wheels of the vehicle, and steering linkage extending from opposite ends of said rack bar for connection with the steerable wheels of the vehicle;

a cross-member having attachment structure for fixed attachment at the opposite sides of the vehicle at locations forward of and rearward of the steering linkage;

a first control arm pivotally connected to said cross member at one side of the vehicle at locations forward of and rearward of the steering linkage;

a second control arm pivotally connected to said cross member at an opposite side of the vehicle at locations forward of and rearward of the steering linkage;

said cross-member having a rack housing portion defining a chamber through which said rack bar extends; and said rack housing portion of said cross-member comprises a generally flat base portion and a generally U-shaped upper portion that projects from said base portion, said base portion and said upper portion defining the chamber through which said rack bar extends and is movable.

17. Apparatus as set forth in claim 16 said base portion and said upper portion are made from separate pieces that are secured together.

18. Apparatus as set forth in claim 17 wherein said portion of said rack bar that extends through said chamber is lubricated and further comprising a sleeve in said chamber for maintaining lubricant on said lubricated portion.

19. Apparatus for attachment to the body of a vehicle which has a front, a rear, and opposite sides and which has steerable wheels, said apparatus comprising:

a rack and pinion steering mechanism including a rack bar movable axially in opposite directions to effect steering movement of the steerable wheels of the vehicle, and steering linkage extending from opposite ends of said rack bar for connection with the steerable wheels of the vehicle;

a cross-member having attachment structure for fixed attachment at the opposite sides of the vehicle at locations forward of and rearward of the steering linkage;

a first control arm pivotally connected to said cross member at one side of the vehicle at locations forward of and rearward of the steering linkage;

a second control arm pivotally connected to said cross member at an opposite side of the vehicle at locations forward of and rearward of the steering linkage;

said cross-member having a rack housing portion defining a chamber through which a lubricated portion of said rack bar extends; and said rack housing portion of said cross-member has a length of no more than about 50% of said cross member.

20. Apparatus as set forth in claim 19 wherein said rack housing portion of said cross-member has a cross-sectional area at least about two times the cross-sectional area of said rack bar where said rack bar extends through said rack housing.

21. Apparatus for attachment to the body of a vehicle which has a front, a rear, and opposite sides and which has steerable wheels, said apparatus comprising:

a rack and pinion steering mechanism including a rack bar movable axially in opposite directions to effect steering movement of the steerable wheels of the vehicle, and steering linkage extending from opposite ends of said rack bar for connection with the steerable wheels of the vehicle;

a cross-member having attachment structure for fixed attachment at the opposite sides of the vehicle at locations forward of and rearward of the steering linkage;

a first control arm pivotally connected to said cross member at one side of the vehicle at locations forward of and rearward of the steering linkage;

a second control arm pivotally connected to said cross member at an opposite side of the vehicle at locations forward of and rearward of the steering linkage;

said cross-member having a rack housing portion defining a chamber through which a lubricated portion of said rack bar extends; and said rack housing portion of said cross-member has a cross-sectional area at least about two times the cross-sectional area of said rack bar where said rack bar extends through said rack housing.

22. Apparatus as set forth in claim 21 wherein said rack housing portion of said cross-member has a cross-sectional area from about two times to about ten times the cross-sectional area of said rack bar where said rack bar extends through said rack housing.

23. Apparatus for attachment to the body of a vehicle which has a front, a rear, and opposite sides and which has steerable wheels, said apparatus comprising:

a rack and pinion steering mechanism including a rack bar movable axially in opposite directions to effect steering movement of the steerable wheels of the vehicle, and steering linkage extending from opposite ends of said rack bar for connection with the steerable wheels of the vehicle;

a cross-member having structure for fixed attachment at the opposite sides of the vehicle body at locations forward of and rearward of the steering linkage;

a first control arm pivotally connected to said cross member at one side of the vehicle at locations forward of and rearward of the steering linkage;

a second control arm pivotally connected to said cross member at an opposite side of the vehicle at locations forward of and rearward of the steering linkage;

said cross-member having a rack housing portion defining a chamber through which a lubricated portion of said rack bar extends; and a sleeve in said chamber for maintaining lubricant on said lubricated portion of said rack bar.

24. Apparatus as set forth in claim 23 wherein said sleeve is made from plastic.

25. An apparatus for attachment to the body of a vehicle which has front, rear and opposite sides and which has steering linkage connected to steerable wheels, said apparatus comprising:

an upper part connected with said lower part, said upper and lower parts being connectable with each of the opposite sides of the vehicle;

a first control arm support connected with said upper and lower parts at one side of the vehicle to at least partially support a control arm connected with a first one of the steerable wheels;

a second control arm support connected with said upper and lower parts at a side of the vehicle opposite from said one side to at least partially support a control arm connected with a second one of the steerable wheels;

a rack housing which is at least partially formed by said upper part and which at least partially defines a rack chamber, said rack chamber extends between first and second end walls of said rack housing; and a steering mechanism connected with said rack housing and being operable to effect steering movement of the steerable wheels of the vehicle;

said steering mechanism including a rack bar which extends through said first and second end walls of said rack housing and includes a lubricated portion disposed in said rack chamber between said first and second end walls of said rack housing, and a steering input assembly connected with said first end wall of said rack housing and disposed outside of said rack chamber, said rack bar extends through said steering input assembly.

26. An apparatus as set forth in claim 25 further including a tubular member disposed in said rack chamber and extending around said rack bar to hold at least a portion of a body of lubricant which lubricates said rack bar.

27. An apparatus as set forth in claim 26 wherein said tubular member is formed of plastic and has a first end portion disposed adjacent to said first end wall of said rack housing and has a second end portion disposed adjacent to said second end wall of said rack housing.

28. An apparatus as set forth in claim 26 wherein said first end wall of said rack housing is disposed between one end of said tubular member and said steering input assembly.

29. An apparatus as set forth in claim 25 wherein said steering mechanism includes a ball nut assembly which is connected with said second end wall of said rack housing and is disposed outside of said rack chamber, said rack bar extends through said ball nut assembly.

30. An apparatus as set forth in claim 25 wherein said steering mechanism includes an electric motor which is disposed outside said rack chamber and is connected with said steering input assembly, said electric motor being operable to facilitate movement of said rack bar and movement of the steerable wheels upon operation of said steering mechanism.

31. An apparatus as set forth in claim 30 wherein said electric motor is disposed adjacent to said second end wall of said rack housing.

32. An apparatus as set forth in claim 25 wherein said rack chamber is at least partially defined by said rack housing and an imperforate surface area which is disposed on said lower part and extends between said first and second end walls of said rack housing.

* * * * *

UNITED STATES PATENT AND TRADEMARK OFFICE
CERTIFICATE OF CORRECTION

PATENT NO.    : 6,783,157 B2
DATED         : August 31, 2004
INVENTOR(S)   : Zugang Huang and Stephen J. Green It is certified that error appears in the above-identified patent and that said Letters Patent is hereby corrected as shown below:

Column 10,
Line 44, after "of" change "ar" to -- and --.

Column 12,
Line 38, after "16" insert -- wherein --.

Column 14,
Line 4, after "comprising:" insert a new paragraph saying -- a lower part; --.

Signed and Sealed this

Fifteenth Day of March, 2005

JON W. DUDAS
*Director of the United States Patent and Trademark Office*